US012412981B2

(12) United States Patent
Hou et al.

(10) Patent No.: US 12,412,981 B2
(45) Date of Patent: Sep. 9, 2025

(54) ANTENNA STRUCTURE AND TERMINAL DEVICE

(71) Applicant: VIVO MOBILE COMMUNICATION CO., LTD., Dongguan (CN)

(72) Inventors: Zipeng Hou, Dongguan (CN); Shaowen Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 192 days.

(21) Appl. No.: 18/219,630

(22) Filed: Jul. 7, 2023

(65) Prior Publication Data

US 2023/0352839 A1 Nov. 2, 2023

Related U.S. Application Data

(63) Continuation of application No. PCT/CN2022/070099, filed on Jan. 4, 2022.

(30) Foreign Application Priority Data

Jan. 8, 2021 (CN) .......................... 202110026528.6

(51) Int. Cl.
*H01Q 1/48* (2006.01)
*H01Q 1/38* (2006.01)
*H01Q 9/04* (2006.01)

(52) U.S. Cl.
CPC ............ *H01Q 9/0407* (2013.01); *H01Q 1/38* (2013.01); *H01Q 1/48* (2013.01)

(58) Field of Classification Search
CPC ............ H01Q 1/24; H01Q 1/243; H01Q 1/22; H01Q 1/36; H01Q 1/48; H01Q 1/50;
(Continued)

(56) References Cited

FOREIGN PATENT DOCUMENTS

| CN | 103346397 A | 10/2013 |
|---|---|---|
| CN | 108767499 A | 11/2018 |

(Continued)

OTHER PUBLICATIONS

International Search Report issued in corresponding International Application No. PCT/CN2022/070099, mailed Mar. 1, 2022, 4 pages.

(Continued)

*Primary Examiner* — Hoang V Nguyen
(74) *Attorney, Agent, or Firm* — IPX PLLC

(57) ABSTRACT

The present application discloses an antenna structure and a terminal device. The antenna structure includes: a resonant branch, a coupling branch, a coupling metal body, and a feeding structure. The resonant branch is provided with a feeding point, one end of the resonant branch is coupled to the coupling branch through a gap, the other end of the resonant branch is grounded through a first grounding point, one end of the coupling branch is coupled to the resonant branch through the gap, the other end of the coupling branch is grounded through a second grounding point, the coupling metal body is suspended in air and is respectively coupled to the resonant branch and the coupling branch, one end of the feeding structure is connected to the feeding point of the resonant branch, and the other end of the feeding structure is grounded.

16 Claims, 1 Drawing Sheet

(58) Field of Classification Search
CPC ...... H01Q 5/328; H01Q 5/385; H01Q 9/0407; H01Q 9/42
See application file for complete search history.

(56) References Cited

FOREIGN PATENT DOCUMENTS

| | | | |
|---|---|---|---|
| CN | 109980364 A | 7/2019 | |
| CN | 110380197 A | 10/2019 | |
| CN | 110380198 A | * 10/2019 | ............. H01Q 1/243 |
| CN | 110474160 A | 11/2019 | |
| CN | 111509368 A | 8/2020 | |
| CN | 112886224 A | 6/2021 | |
| EP | 2811573 A1 | 12/2014 | |
| TW | 201318264 A | 5/2013 | |

OTHER PUBLICATIONS

First Office Action issued in related Chinese Application No. 202110026528.6, mailed Sep. 22, 2022, 4 pages.
Second Office Action issued in related Chinese Application No. 202110026528.6, mailed Apr. 28, 2023, 7 pages.

* cited by examiner

ANTENNA STRUCTURE AND TERMINAL DEVICE

CROSS-REFERENCE TO RELATED APPLICATIONS

This application is a continuation of International Application No. PCT/CN2022/070099, filed Jan. 4, 2022, which claims priority to Chinese Patent Application No. 202110026528.6, filed Jan. 8, 2021. The entire contents of each of the above-referenced applications are expressly incorporated herein by reference.

TECHNICAL FIELD

The present application relates to the technical field of communication, and in particular, to an antenna structure and a terminal device.

BACKGROUND

With the rapid development of communication technologies, mobile terminals have been further developed. In order to meet the needs of users in different aspects, mobile terminals have more and more requirements on antenna operating bands. Therefore, it is a current design trend to design antennas with higher utilization rates in a limited space.

In related technologies, network coverage is mainly concentrated in the middle band, but dual-branch intermediate and high frequency bandwidth coverage is insufficient, which leads to the problem that the radiation efficiency of the middle band is not high enough.

SUMMARY

The present application discloses an antenna structure and a terminal device. The disclosed embodiments may effectively increase the coupling adjustability of the antenna structure, and further improve the radiation efficiency of the antenna structure in the middle band.

In a first aspect, the embodiments of the present application disclose an antenna structure, including: a resonant branch, a coupling branch, a coupling metal body, and a feeding structure, where the resonant branch is provided with a feeding point, one end of the resonant branch is coupled to the coupling branch through a gap, the other end of the resonant branch is grounded through a first grounding point, one end of the coupling branch is coupled to the resonant branch through a gap, the other end of the coupling branch is grounded through a second grounding point, the coupling metal body is suspended in the air and is respectively coupled to the resonant branch and the coupling branch, one end of the feeding structure is connected to the feeding point of the resonant branch, and the other end of the feeding structure is grounded.

In a second aspect, the present application discloses a terminal device, including the antenna structure described in the first aspect.

In the antenna structure disclosed in the embodiments of the present application, the coupling metal body is suspended in the air and is respectively connected to the resonant branch and the coupling branch, so that the antenna structure effectively increases the coupling adjustability, thereby improving the radiation efficiency of the middle band.

DETAILED DESCRIPTION

The following describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

The terms "first", "second", and the like in the description and the claims of this application are used to distinguish between similar objects, and do not need to be used to describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

Figure 1:
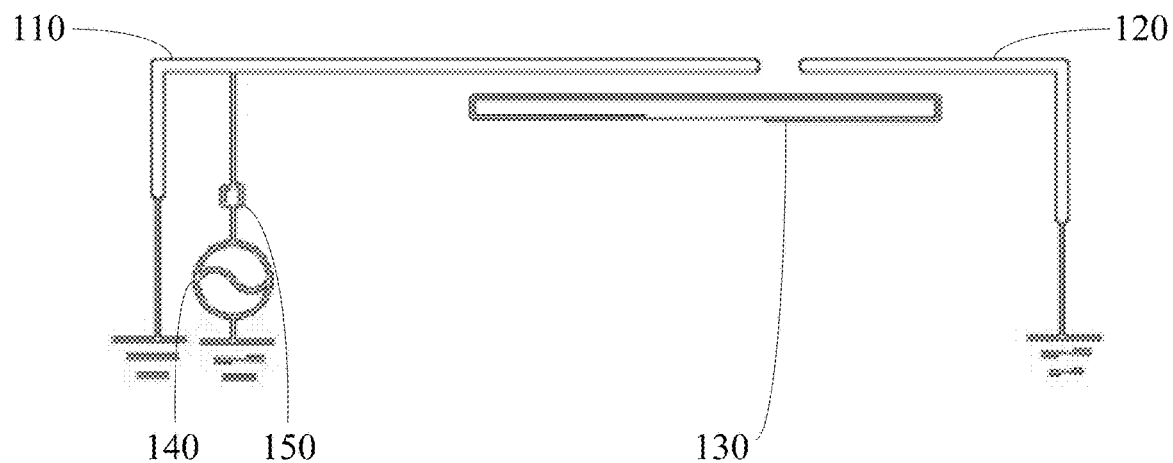
FIG. 1 is a schematic structural diagram of an antenna structure disclosed in an embodiment of the present application.

The embodiments of the present application disclose an antenna structure. FIG. 1 is a schematic structural diagram of an antenna structure disclosed in an embodiment of the present application. As shown in FIG. 1, the antenna structure disclosed in the embodiments of the present application includes: a resonant branch 110, a coupling branch 120, a coupling metal body 130, and a feeding structure 140, where the resonant branch 110 is provided with a feeding point, one end of the resonant branch 110 is coupled to the coupling branch 120 through a gap, the other end of the resonant branch 110 is grounded through a first grounding point (that is, the other end of the resonant branch 110 is grounded to form the first grounding point, that is, a point where the resonant branch 110 is connected to the ground); one end of the coupling branch 120 is coupled to the resonant branch 110 through a gap, the other end of the coupling branch 120 is grounded through a second grounding point (that is, the other end of the coupling branch 120 is grounded to form the second grounding point), the coupling metal body 130 is suspended in the air and is respectively coupled to the resonant branch 110 and the coupling branch 120, one end of the feeding structure 140 is connected to the feeding point of the resonant branch 110, and the other end of the feeding structure 140 is grounded (that is, the other end of the feed structure is grounded to form a third grounding point).

In the embodiments of the present application, that the coupling metal body 130 is suspended in the air means that the coupling metal body 130 is fixed in the terminal through a non-conductive structure, and is not electrically connected to other components. For example, the coupling metal body 130 can be fixed in the vicinity of a gap coupling area of the resonant branch 110 and the coupling branch 120 through non-metal structure.

In the antenna structure provided by the embodiments of the present application, two antenna branches, that is, the resonant branch 110 and the coupling branch 120, can be formed by opening a slit or a slot on the metal body. The slit or the slot of the metal body are formed in a coupling region for gap coupling of the resonant branch 110 and the coupling branch 120. The coupling metal body 130 is arranged near the gap coupling area formed by the resonant branch 110 and the coupling branch 120, and the coupling metal body 130 is fixed in the mobile terminal through non-metal structure, and is not grounded and is not connected to the feeding structure. The resonant branch 110 and the coupling branch 120 form spatial coupling with the coupling metal body 130, which effectively improves the radiation efficiency of low frequencies in an antenna radiation band, for example, can effectively improve the radiation efficiency of the middle band in intermediate and high frequency antennas.

In the embodiments of the present application, the resonant branch 110 and the coupling branch 120 are formed by opening a slit or a slot on the metal body, so that the antenna structure is separated from the structure, and the frequency of the antenna is also basically separated. The radiation in intermediate and high bands can effectively improve the radiation efficiency bandwidth by using effective radiators of different sizes. From the perspective of the antenna structure, when the antenna works in the high band, the resonant branch 110 and the coupling branch 120 in the antenna structure cooperate to realize the improvement of the radiation frequency bandwidth; when the antenna works in the middle band, the resonant branch 110 in the antenna structure plays a major role in improving the radiation frequency bandwidth. The coupling metal body 130 suspended in the air in the antenna structure effectively increases the coupling adjustability, and can enhance the radiation contribution of the coupling branch 120 in the antenna structure to the middle band, thereby improving the radiation efficiency of the middle band.

In the antenna structure disclosed in the embodiments of the present application, a length or a width of the coupling metal body 130 is related to a coupling amount of the resonant branch 110 and the coupling branch 120. The embodiments of the present application do not specifically limit the length or the width of the coupling metal body 130. The specific length or width of the coupling metal body 130 can be correspondingly designed according to the specific band to be realized.

In the embodiments of the present application, the antenna structure disclosed in the present application further includes a matching circuit 150, and the matching circuit 150 is connected between the feeding point and the feeding structure 140, that is, one end of the matching circuit 150 is connected to the feeding point, the other end of the matching circuit 150 is connected to the feeding structure 140, one end of the feeding structure 140 is connected to the matching circuit 150, and the other end of the feeding structure 140 is grounded. The matching circuit 150 can realize effective radiation in the intermediate and high bands.

In a further technical solution, a distance between the feeding point and the first grounding point is less than 3 mm. When the distance between the feeding point and the first grounding point is less than 3 mm, the radiation frequency of the antenna in the middle band can be expanded, and thus the bandwidth of the antenna in the middle band can be expanded.

In a possible implementation manner of the embodiments of the present application, the matching circuit 150 may include: a capacitive element, or a capacitive-inductive combination element. In the case that the matching circuit 150 includes a capacitive element or a capacitive-inductive combination element, the adjustment of a coupling band can be realized by using the characteristic of the capacitance or inductance, and then the effective radiation of the intermediate and high frequency bands can be realized, and any carrier aggregation bandwidth in the intermediate and high bands can be covered.

In a further technical solution, the matching circuit 150 may also include a switch tuning circuit. A matching network designed at an access point of the feeding structure 140 includes a switch tuning circuit, which can realize higher bandwidth of a non-carrier aggregation frequency, such as B39/41.

Figure 2:
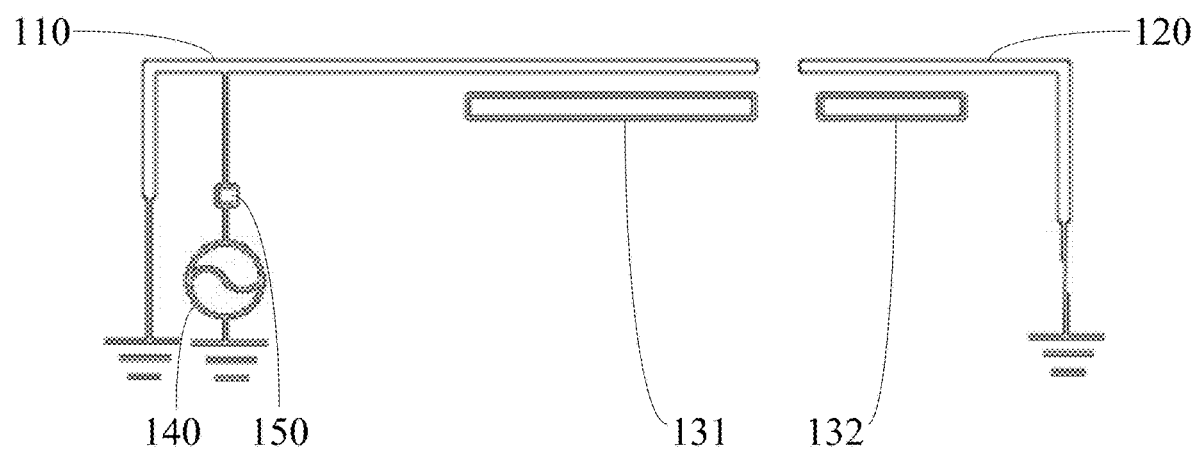
FIG. 2 is another structural schematic diagram of an antenna structure disclosed in an embodiment of the present application.

FIG. 2 is another structural schematic diagram of an antenna structure disclosed in an embodiment of the present application. As shown in FIG. 2, the antenna structure includes a resonant branch 110, a coupling branch 120, a matching circuit 150, a feeding structure 140, and a coupling metal body 130. On the basis of the embodiment in FIG. 1, the coupling metal body 130 includes a first coupling metal body 131, a second coupling metal body 132, and a filtering circuit (not shown in the figure). The first coupling metal body 131 is suspended in the air and coupled to the resonant branch 110, and the second coupling metal body 132 is suspended in the air and coupled to the coupling branch 120, and the first coupled metal body 131 and the second coupled metal body 132 are connected through a filtering circuit. The first coupling metal body 131 can be fixed on an inner side of the resonant branch 110 through a non-conductive structure (for example: non-metal structure), the second coupling metal body 132 can be fixed on an inner side of the coupling branch 120 through a non-conductive structure (for example: non-metal structure), and the filter circuit has certain frequency selectivity and is configured to select a signal of a suitable frequency.

In a further technical solution, the filter circuit can be a resonant circuit, and the first coupling metal body 131 and the second coupling metal body 132 are connected through a series resonant circuit. On the basis that spatial coupling between the coupling metal body 130 and the resonant branch 110 and the coupling branch 120 is achieved to improve the radiation efficiency of the middle band that is a main band, a resonant circuit is connected in series between the first coupling metal body 131 and the second coupling metal body 132, and the resonant circuit has certain frequency selectivity. Therefore, coupling can be added in a band in which spatial coupling between the resonant branch 110 and/or the coupling branch 120 and the coupling metal body 130 is needed, and coupling can be removed in a band in which spatial coupling between the resonant branch 110 and/or the coupling branch 120 and the coupling metal body 130 is not needed. This can better reduce the reduction degree of the radiation efficiency of the high band when the coupling branch 120 better improves the radiation efficiency of the middle band.

In some embodiments, the resonant circuit may be a combined circuit of capacitive and inductive elements. The combined circuit of capacitive and inductive elements has certain frequency selectivity, which can add spatial coupling between the resonant branch 110 and/or the coupling branch 120 and the first coupling metal body 131 and/or the second coupling metal body 132 in a band in which the antenna needs coupling, and remove the spatial coupling between the resonant branch 110 and/or the coupling branch 120 and the first coupling metal body 131 and/or the second coupling metal body 132 in a band in which the antenna structure does not need coupling. Therefore, while the radiation efficiency of the intermediate frequency band that is a main band is improved, the reduction degree of the radiation efficiency of the high band that is a secondary band is reduced.

It should be noted that the embodiments of the present application do not specifically limit the length or width of the first coupling metal body 131 and the second coupling metal body 132. The specific length or width of the first coupling metal body 131 and the second coupling metal body 132 can be correspondingly designed according to the specific band to be realized.

In the embodiments of the present application, the coupling metal body 130 may be a solid metal, and the solid metal may form a spatial coupling with the resonant branch 110 and/or the coupling branch 120.

In some embodiments, one or more through holes may also be provided on the coupling metal body 130, and by providing the through holes, the weight of the coupling metal body 130 can be reduced without affecting spatial coupling formed between the coupling metal body 130 and the resonant branch 110 and/or the coupling branch 120.

In the embodiments of the present application, a frequency range of a signal radiated by the antenna structure is: 1.71 GHz to 2.69 GHz.

Based on the foregoing antenna structure, the embodiment of the present application discloses a terminal device, including the foregoing antenna structure. There are many types of terminal devices, which may be tablets, notebooks, mobile phones, watches, etc., which are not specifically limited in the embodiments of the present application.

The foregoing embodiments of this application focus on describing differences between the embodiments, and different optimization features of the embodiments may be combined to form better embodiments provided that they are not contradictory. For brevity, details are not described herein again.

The foregoing descriptions are merely embodiments of this application, and are not intended to limit this application. Any modifications, equivalent substitutions, improvements, and the like made within the spirit and principle of this application should be included within the scope of the claims of this application.

The invention claimed is:

1. An antenna structure, comprising: a resonant branch, a coupling branch, a coupling metal body, and a feeding structure, wherein:
   the resonant branch is provided with a feeding point, one end of the resonant branch is coupled to the coupling branch through a gap, and the other end of the resonant branch is grounded through a first grounding point;
   one end of the coupling branch is coupled to the resonant branch through the gap, and the other end of the coupling branch is grounded through a second grounding point;
   the coupling metal body is suspended in air and is respectively coupled to the resonant branch and the coupling branch; and
   one end of the feeding structure is connected to the feeding point of the resonant branch, and the other end of the feeding structure is grounded,
   wherein the coupling metal body comprises a first coupling metal body, a second coupling metal body, and a filtering circuit, wherein;
      the first coupling metal body is suspended in the air and coupled to the resonant branch;
      the second coupling metal body is suspended in the air and coupled to the coupling branch; and
      the first coupling metal body and the second coupling metal body are connected through the filtering circuit.

2. The antenna structure according to claim 1, further comprising: a matching circuit connected between the feeding point and the feeding structure.

3. The antenna structure according to claim 1, wherein a distance between the feeding point and the first grounding point is less than 3 mm.

4. The antenna structure according to claim 1, wherein the filtering circuit is a resonant circuit.

5. The antenna structure according to claim 4, wherein the resonant circuit is a combined circuit of capacitive and inductive elements.

6. The antenna structure according to claim 1, wherein the coupling metal body is a solid metal.

7. The antenna structure according to claim 6, wherein one or more through holes are provided on the coupling metal body.

8. The antenna structure according to claim 1, wherein a frequency range of a signal radiated by the antenna structure is: 1.71 GHz to 2.69 GHz.

9. A terminal device, comprising an antenna structure, wherein the antenna structure comprises: a resonant branch, a coupling branch, a coupling metal body, and a feeding structure, wherein:
   the resonant branch is provided with a feeding point, one end of the resonant branch is coupled to the coupling branch through a gap, and the other end of the resonant branch is grounded through a first grounding point;
   one end of the coupling branch is coupled to the resonant branch through the gap, and the other end of the coupling branch is grounded through a second grounding point;
   the coupling metal body is suspended in air and is respectively coupled to the resonant branch and the coupling branch; and
   one end of the feeding structure is connected to the feeding point of the resonant branch, and the other end of the feeding structure is grounded,
   wherein the coupling metal body comprises a first coupling metal body, a second coupling metal body, and a filtering circuit, wherein:
      the first coupling metal body is suspended in the air and coupled to the resonant branch:
      the second coupling metal body is suspended in the air and coupled to the coupling branch; and
      the first coupling metal body and the second coupling metal body are connected through the filtering circuit.

10. The terminal device according to claim 9, wherein the antenna structure further comprises: a matching circuit connected between the feeding point and the feeding structure.

11. The terminal device according to claim 9, wherein a distance between the feeding point and the first grounding point is less than 3 mm.

12. The terminal device according to claim 9, wherein the filtering circuit is a resonant circuit.

13. The terminal device according to claim 12, wherein the resonant circuit is a combined circuit of capacitive and inductive elements.

14. The terminal device according to claim 9, wherein the coupling metal body is a solid metal.

15. The terminal device according to claim 14, wherein one or more through holes are provided on the coupling metal body.

16. The terminal device according to claim 9, wherein a frequency range of a signal radiated by the antenna structure is: 1.71 GHz to 2.69 GHz.

* * * * *